United States Patent
Speldrich

(10) Patent No.: US 7,343,823 B2
(45) Date of Patent: Mar. 18, 2008

(54) ULTRA LOW PRESSURE DROP FLOW SENSOR

(75) Inventor: Jamie W. Speldrich, Freeport, IL (US)

(73) Assignee: Honeywell International Inc., Morristown, NJ (US)

(*) Notice: Subject to any disclaimer, the term of this patent is extended or adjusted under 35 U.S.C. 154(b) by 19 days.

(21) Appl. No.: 11/356,814

(22) Filed: Feb. 17, 2006

(65) Prior Publication Data
US 2007/0193368 A1    Aug. 23, 2007

(51) Int. Cl.
*G01F 1/46* (2006.01)

(52) U.S. Cl. ..................... 73/861.65; 73/202
(58) Field of Classification Search .............. 73/861.52
See application file for complete search history.

(56) References Cited

U.S. PATENT DOCUMENTS

| | | | |
|---|---|---|---|
| 2,746,296 A * | 5/1956 | Stover | 73/701 |
| 3,410,287 A | 11/1968 | VanDerHeyden et al. | 137/36 |
| 3,559,482 A | 2/1971 | Baker et al. | |
| 3,838,598 A * | 10/1974 | Tompkins | 73/861.52 |
| 3,895,531 A * | 7/1975 | Lambert | 73/861.66 |
| 3,952,577 A * | 4/1976 | Hayes et al. | 73/54.04 |
| 4,444,060 A * | 4/1984 | Yamamoto | 73/861.66 |
| 4,481,828 A * | 11/1984 | Cheng | 73/861.63 |
| 4,581,945 A * | 4/1986 | Rusz | 73/861.52 |
| 4,696,194 A | 9/1987 | Taylor | |
| 4,768,386 A * | 9/1988 | Taddeo | 73/861.66 |
| 5,000,478 A | 3/1991 | Kerastas | 280/707 |
| 5,379,650 A * | 1/1995 | Kofoed et al. | 73/861.52 |
| 5,481,925 A * | 1/1996 | Woodbury | 73/861.66 |
| 5,535,633 A * | 7/1996 | Kofoed et al. | 73/861.52 |
| 5,735,267 A | 4/1998 | Tobia | 128/204.21 |
| 5,789,660 A * | 8/1998 | Kofoed et al. | 73/23.2 |
| 6,044,716 A * | 4/2000 | Yamamoto | 73/861.66 |
| 6,119,730 A * | 9/2000 | McMillan | 138/43 |
| 6,312,389 B1* | 11/2001 | Kofoed et al. | 600/532 |
| 6,527,835 B1* | 3/2003 | Manginell et al. | 96/102 |
| 6,543,449 B1 | 4/2003 | Woodring et al. | 128/204.18 |

(Continued)

FOREIGN PATENT DOCUMENTS

EP    0255056 A2    2/1988

(Continued)

*Primary Examiner*—Harshad Patel
(74) *Attorney, Agent, or Firm*—Kermit D. Lopez; Luis M. Ortiz; William B. Shelby

(57) ABSTRACT

A fluid velocity sensor includes a sensor die for detecting a fluid property of a fluid flowing through a low resistance flow channel defined by a flow channel wall. One or more tap can be oriented facing into a direction of a flow stream of a fluid flowing through a flow channel defined by a channel wall, wherein the tap(s) leads to the low resistance flow channel, which directs the flow to the sensor die. At least one or more other taps can be located to face perpendicular to the direction of flow, such that the fluid after passing over the sensor die continues on a low resistance path to the other tap(s) facing perpendicular to the direction of flow in order to determine a velocity pressure based on a difference between pressures. The fluid velocity sensor can be arranged in a uni-directional or bi-directional fluid flow configuration.

20 Claims, 7 Drawing Sheets

U.S. PATENT DOCUMENTS

| | | |
|---|---|---|
| 6,655,207 B1 | 12/2003 | Speldrich et al. ........... 73/202.5 |
| 6,761,165 B2 | 7/2004 | Strickland, Jr. ........ 128/204.22 |
| 6,769,299 B2* | 8/2004 | Forster et al. ........... 73/204.26 |
| 6,901,795 B2* | 6/2005 | Naguib et al. ........... 73/204.27 |
| 6,904,799 B2 | 6/2005 | Cohen et al. ............ 73/204.11 |
| 6,957,586 B2* | 10/2005 | Sprague ................... 73/861.22 |
| 2003/0062045 A1 | 4/2003 | Woodring et al. ..... 128/204.18 |
| 2005/0016534 A1 | 1/2005 | Ost ....................... 128/204.18 |
| 2005/0022594 A1 | 2/2005 | Padmanabhan et al. .. 73/204.26 |
| 2005/0087190 A1 | 4/2005 | Jafari er al. ........... 128/204.21 |
| 2005/0183500 A1 | 8/2005 | Kanouda et al |
| 2006/0112771 A1* | 6/2006 | Mizohata .................. 73/861.52 |

FOREIGN PATENT DOCUMENTS

WO     WO 92/21940 A1     12/1992

\* cited by examiner

ULTRA LOW PRESSURE DROP FLOW SENSOR

TECHNICAL FIELD

Embodiments are generally related to sensing devices and methods. Embodiments are also related to the field of fluid velocity measurement.

BACKGROUND OF THE INVENTION

Many processes and devices make use of moving fluids. Some examples are heating and ventilating systems that make use of moving air, as well as manufacturing processes that rely on the use and flow of various gasses. Typically, for these processes and/or devices, it is important that the flowrate of the fluid be accurately determined. Accordingly, various techniques to determine the flowrate of a fluid have been developed.

One area where flow sensors find particular usefulness is in medical ventilators. Medical ventilator systems have been long used to provide supplemental oxygen support to patients unable to breathe normally on their own accord. Such devices typically comprise a source of pressurized air or oxygen-rich air which is fluidly connected to the patient through a fluid conduit.

Ventilators are used by patients in various health situations. A primary application of ventilators is to relieve breathing problems due to obstructive sleep apnea in which a patient benefits from positive air pressure applied to their breathing passage. Portable home ventilator machines provide a continuous pressure or modulated pressure to help open breathing passages during sleep. Other patients have weak physiological attributes that prevent them from breathing unassisted and require invasive ventilation. Invasive ventilatory support generally requires the patient having either a tracheotomy or endotracheal tube disposed into the trachea of the patient. Such treatment generally occurs in hospitals and is administered in acute care situations or post operative recovery situations.

Manufacturers of medical ventilator equipment require a low pressure drop to insure efficient blower operations. To monitor fluid flow in ventilators, products such as a Honeywell flow channel housing AWM720 can be utilized. An example of the AWM720 device is disclosed in U.S. Pat. No. 6,655,207, entitled "Flow Rate Module and Integrated Flow Restrictor," which issued to Speldrich et al on Dec. 2, 2003 and is assigned to Honeywell International Inc. U.S. Pat. No. 6,655,207 is incorporated herein by reference in its entirety. The device disclosed in U.S. Pat. No. 6,655,207 generally relates to a flow sensor having a restrictor to create a small pressure drop in parallel with a substrate having a sensing element and flow channel aligned over the sensing element. The sensing element senses at least one property of a fluid. The flow channel across the sensing area is accurately and precisely aligned facilitating reliable, low-cost, and consistent results among multiple flow sensors.

This type of technology, when utilized in the context of a medical ventilator, typically utilizes a low pressure drop restrictor in parallel with a bypass channel to drive a fraction of the flow in the main channel past the mass airflow sensor. This technique measures the mass flow rate of the main channel and volume flow rate can be inferred by knowing the density of the fluid. Although only a small pressure drop in the range of 2 in $H_2O$ is added to the system, it is undesirable in medical ventilator applications.

In order to address the needs of flow sensing in medical ventilator applications, it is believed that an improved flow sensor should be implemented. It is believed that the improved fluid velocity sensor disclosed herein can address these and other continuing needs.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensor.

It is another aspect of the present invention to provide for a fluid velocity sensor with low pressure drop.

It is a further aspect of the present invention to provide for a bi-directional fluid velocity sensor with low pressure drop and methodology thereof.

The aforementioned aspects and other objectives and advantages can now be achieved as described herein. A fluid velocity sensor and method are disclosed, in accordance with one embodiment, which includes a sensor die for detecting a fluid property of a fluid flowing through a low resistance flow channel defined by a flow channel wall. At least one tap can be oriented facing into a direction of a flow stream of a fluid flowing through a flow channel defined by a flow channel wall, wherein the tap(s) leads to the low resistance flow channel, which directs the flow of fluid to the sensor die. At least one other tap can be located to face perpendicular to the direction of flow, such that the fluid after passing over the sensor die continues on a low resistance path to the other tap(s) facing perpendicular to the direction of flow in order to determine a velocity pressure based on a difference between pressures identified by the taps.

In accordance with an alternative embodiment, a flow straightener can be associated with the flow channel, wherein the flow straightener promotes a bi-directional flow of fluid through the flow channel. The flow straightener can be provided as a restrictor in the shape of a narrow, elongated protrusion that prevents flow eddies, which create pressure instability.

Sensing fluid velocity in one direction can be accomplished by orienting upstream tap(s) to face into the direction of the gas flow and a downstream tap(s) to face perpendicular to gas flow. The upstream tap senses stagnation pressure of the gas (i.e., the impact as the gas comes to a stop) and the down stream tap senses static pressure which is exerted in all directions in the flow channel. The difference between the pressures is the velocity pressure which drives flow through a bypass channel to a flow sensor. A Pitot tube, for example is based on this phenomena. Historically, though, a pitot tube generates such small pressure drop, it was traditionally used with an incline manometer which is not easily incorporated into electronic circuitry for efficient measurement. Using a flow sensor or ultra low pressure sensor, the velocity pressure can be sensed electronically. In addition, this technique of sensing velocity pressure eliminates the need to add pressure drop to the system to measure flow.

The fluid velocity sensor may also be configured to sense bi-directional flow by utilizing a tap or multiple taps which face into the direction of the flow stream that is measured.

The taps lead to a low resistance flow channel which directs the flow to the flow sensor. The channel is designed to control and laminarize flow. After passing over the flow sensor, the channel continues on a low resistance path to an exhaust tap or multiple taps which face opposite the direction of the flow. Alternatively, the taps may be directed to a dead end channel to be measured by a differential type low pressure sensor. The orientation of the taps in this configuration produces the difference between stagnation pressure and drag pressure which can be correlated to the velocity of the fluid.

By using a sensor of this type to measure fluid velocity in a channel, the volume flow rate in the channel can be inferred.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
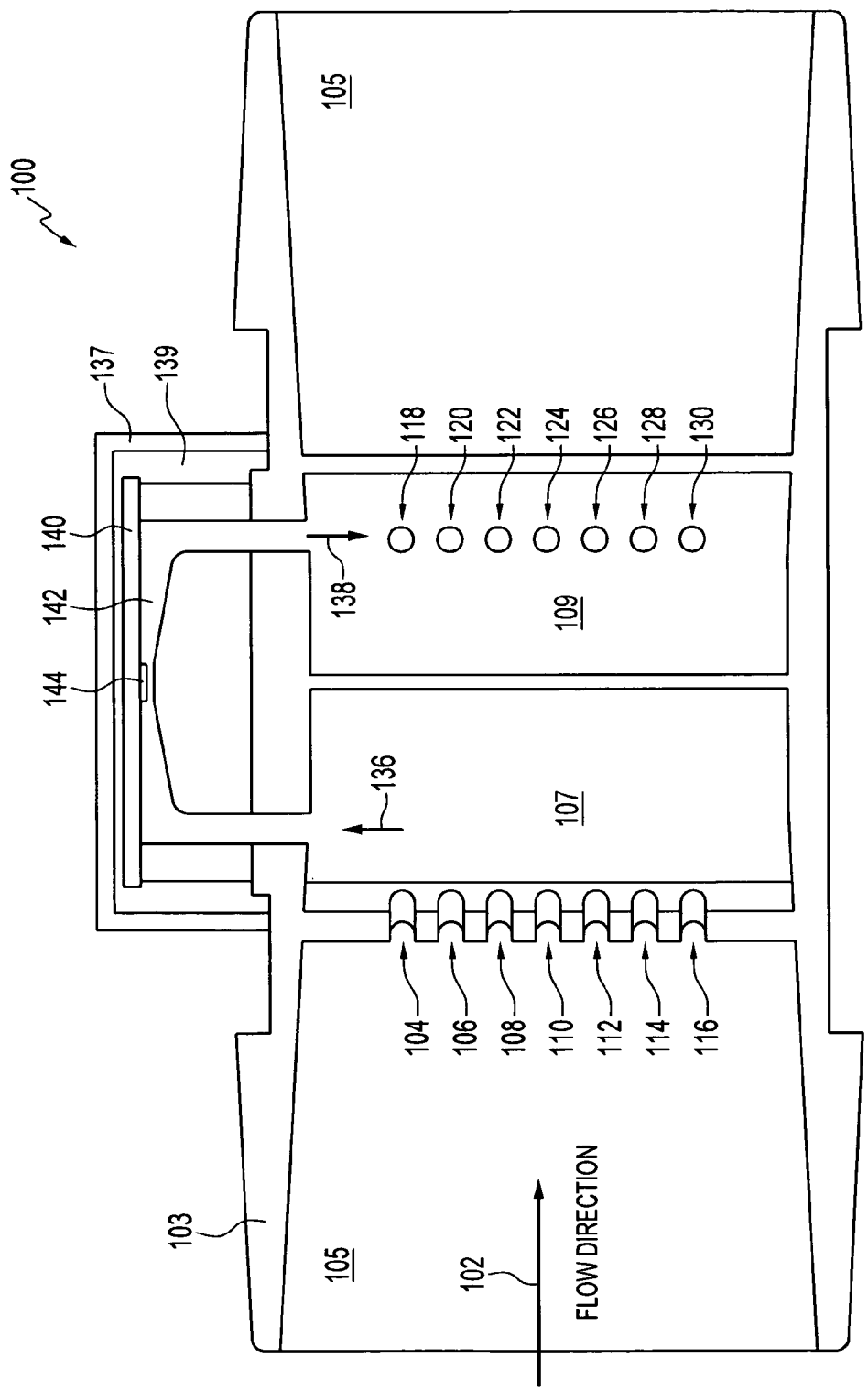
FIG. 1 illustrates a fluid velocity sensor apparatus, which can be implemented in accordance with a preferred embodiment.

FIG. 1 illustrates a fluid velocity sensor apparatus 100 a flow channel 105 through which a fluid can flow as indicated by arrow 102. Note that as utilized herein the term "fluid" can refer to a liquid or a gas. The flow channel 105 can be defined by a flow channel wall 103. One or more upstream taps 104, 106, 108, 110, 112, 114, and 116 can be oriented upstream in flow channel 105 to face into the direction of fluid (e.g., gas) flow. The taps 104, 106, 108, 110, 112, 114, and 116 can be implemented as inlet taps that face into the flow of fluid indicated by arrow 102. As utilized herein, the term "tap" can refer to a small opening that permits flow of a liquid or gas.

Apparatus 100 additionally includes one or more downstream taps 118, 120, 122, 124, 126, 128, and 130 that face perpendicular to the fluid flow. The downstream taps 118, 120, 122, 124, 126, 128, and 130 can function as exhaust taps. The downstream taps 118, 120, 122, 124, 126, 128, and 130 face perpendicular to the flow of fluid. The upstream taps 104, 106, 108, 110, 112, 114, and 116 can sense the stagnation pressure of the fluid (i.e., the impact as the fluid comes to a stop) and the downstream taps 118, 120, 122, 124, 126, 128, and 130 can sense the static pressure which is exerted in all directions in the flow channel 105. The difference between the stagnation pressure and the static pressure constitutes the velocity pressure, which drives the flow of fluid through a bypass channel 142 to a sensor die 144, which can be implemented as, for example, a MEMS type airflow sensor. It can be appreciated, of course, that the sensor die, may be configured in the context of other types of sensor designs, not merely MEMS-type configurations.

Note that as utilized herein the acronym "MEMS" refers generally to term "Micro-electro-mechanical Systems". MEMS devices refer to mechanical components on the micrometer size and include 3D lithographic features of various geometries. They are typically manufactured using planar processing similar to semiconductor processes such as surface micromachining and/or bulk micromachining. These devices generally range in size from a micrometer (a millionth of a meter) to a millimeter (thousandth of a meter). At these size scales, a human's intuitive sense of physics do not always hold true. Due to MEMS' large surface area to volume ratio, surface effects such as electrostatics and wetting dominate volume effects such as inertia or thermal mass. MEMS devices can be fabricated using modified silicon fabrication technology (used to make electronics), molding and plating, wet etching (KOH, TMAH) and dry etching (RIE and DRIE), electro discharge machining (EDM), and other technologies capable of manufacturing very small devices. MEMS sometimes goes by the names micromechanics, micro machines, or micro system technology (MST).

The design of apparatus 100 thus requires one or more taps 104, 106, 108, 110, 112, 114, and 116, which face into the direction of the flow stream that is to be measured. The taps 104, 106, 108, 110, 112, 114, and 116 lead to one or more low resistance channels 107, 109, which can direct the flow of fluid to the sensor die 144 (e.g., MEMS sensor). The sensor die 144 and the channel 142 are located adjacent a housing component 140, which is protected by a housing area 137, which in turn is situated within a housing 139.

The low resistance channels 107, 109 can be designed to control and laminarize the flow of fluid. Note that the flow of fluid to channel 142 is indicated by arrow 136, while the flow of fluid out of channel 142 is indicated by arrow 138. Thus, the fluid flow from channel 107 into channel 142 and thereafter into channel 109 is represented by arrows 136 and 138. After passing over the sensor die 144, the fluid continues on a low resistance path to one or more of the exhaust taps 118, 120, 122, 124, 126, 128, and 130, which face perpendicular to the direction of the fluid flow. Alternatively, the taps 118, 120, 122, 124, 126, 128, and 130 may be directed to a dead end channel (not shown in FIG. 1) to be measured by a differential MEMS type low pressure sensor (also not shown in FIG. 1). Apparatus 100 thus eliminates the need to add a pressure drop by means of a restrictor to measure fluid flow.

Figure 2:
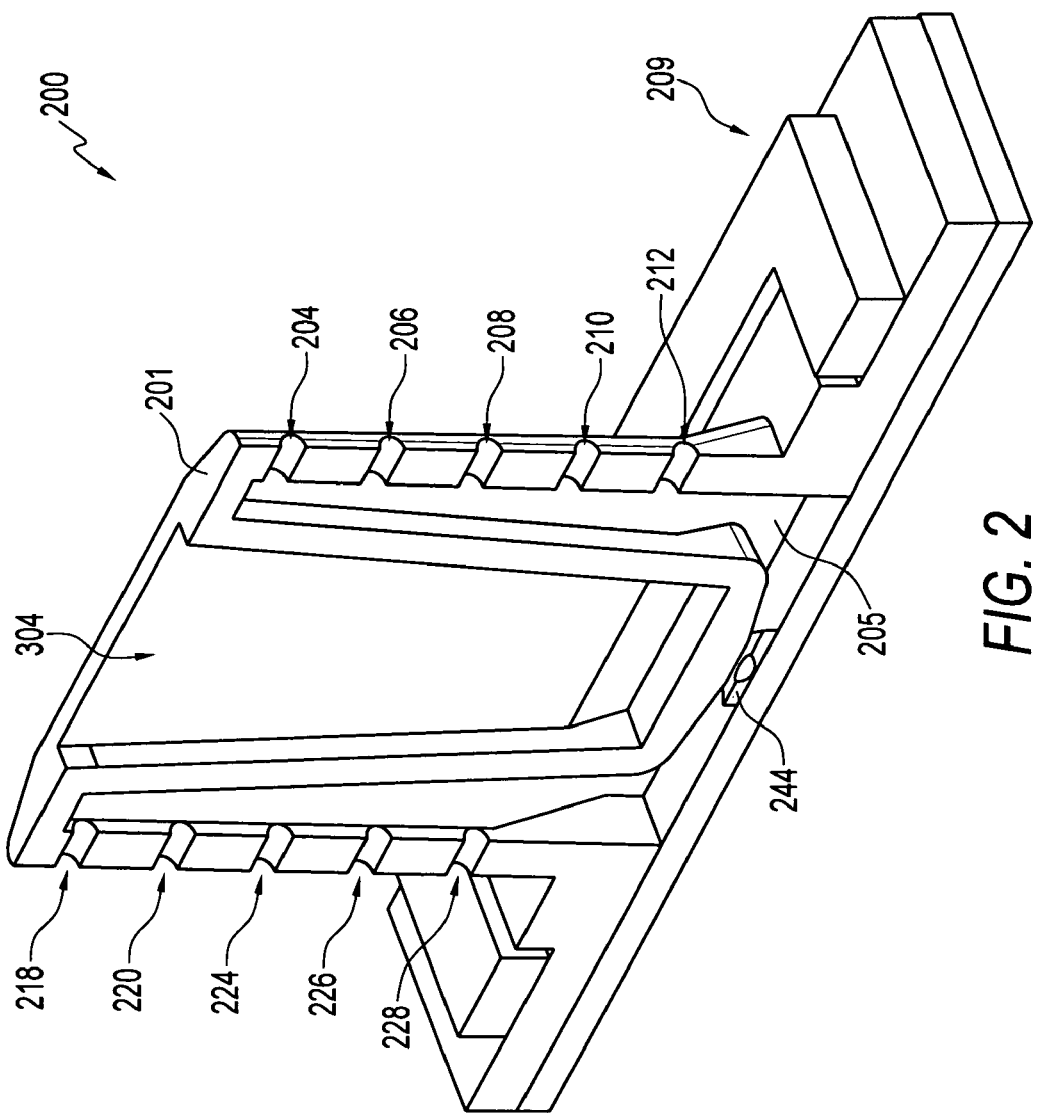
FIG. 2 illustrates a cut-away sectional view of a fluid velocity sensor apparatus, which can be implemented in accordance with an alternative, but preferred embodiment.

FIG. 2 illustrates a cut-away sectional view of a fluid velocity sensor apparatus 200, which can be implemented in accordance with an alternative, but preferred embodiment. As indicated above, apparatus 100 of FIG. 1 can eliminate the need to add a pressure drop by means of a restrictor measure fluid flow. The configuration of apparatus 100, however, only allows one-directional flow measurement. Apparatus 200 offers a configuration that is similar to that of apparatus 100, but which permits bi-directional fluid flow.

Apparatus 200 generally includes one or more inlet or upstream taps 204, 206, 208, 210, and 212 and one or more outlet or downstream taps 218, 220, 224, 226, and 228.

A flow channel 205 is also provided, which leads to the contact of fluid flowing through channel 205 with a flow sensor 244 (e.g., a MEMS flow sensor), that is similar to the sensor die 144 depicted in FIG. 1. Flow channel 205 can be provided as a low resistance flow channel. The upstream taps 204, 206, 208, 210, and 212 are located in a housing 201 and oriented to face the direction of fluid (i.e., gas or liquid) flow. The housing 201 extends generally upward and perpendicular to a stepped platform 209 for maintaining the housing 201. The taps 204, 206, 208, 210, and 212 lead to the low resistance flow channel 205, which can control a direct the bypass flow to the flow sensor 244. After passing over the flow sensor 244, the bypass flow of fluid continues in a low resistance flow path and exhausts through taps 218, 220, 224, 226, and 228, which are oriented opposite the direction of flow. A chamber 304 is also indicated in FIG. 2 between the ports or taps 204, 206, 208, 210, and 212 and the ports or taps 218, 220, 224, 226, and 228. Note that chamber 304 can be designed as part of an injection mold. The chamber or void 304 can assist in the molding process for constructing the internal flow channel, depending upon design considerations. Chamber 304 is thus not considered a critical aspect of the embodiments.

Figure 3:
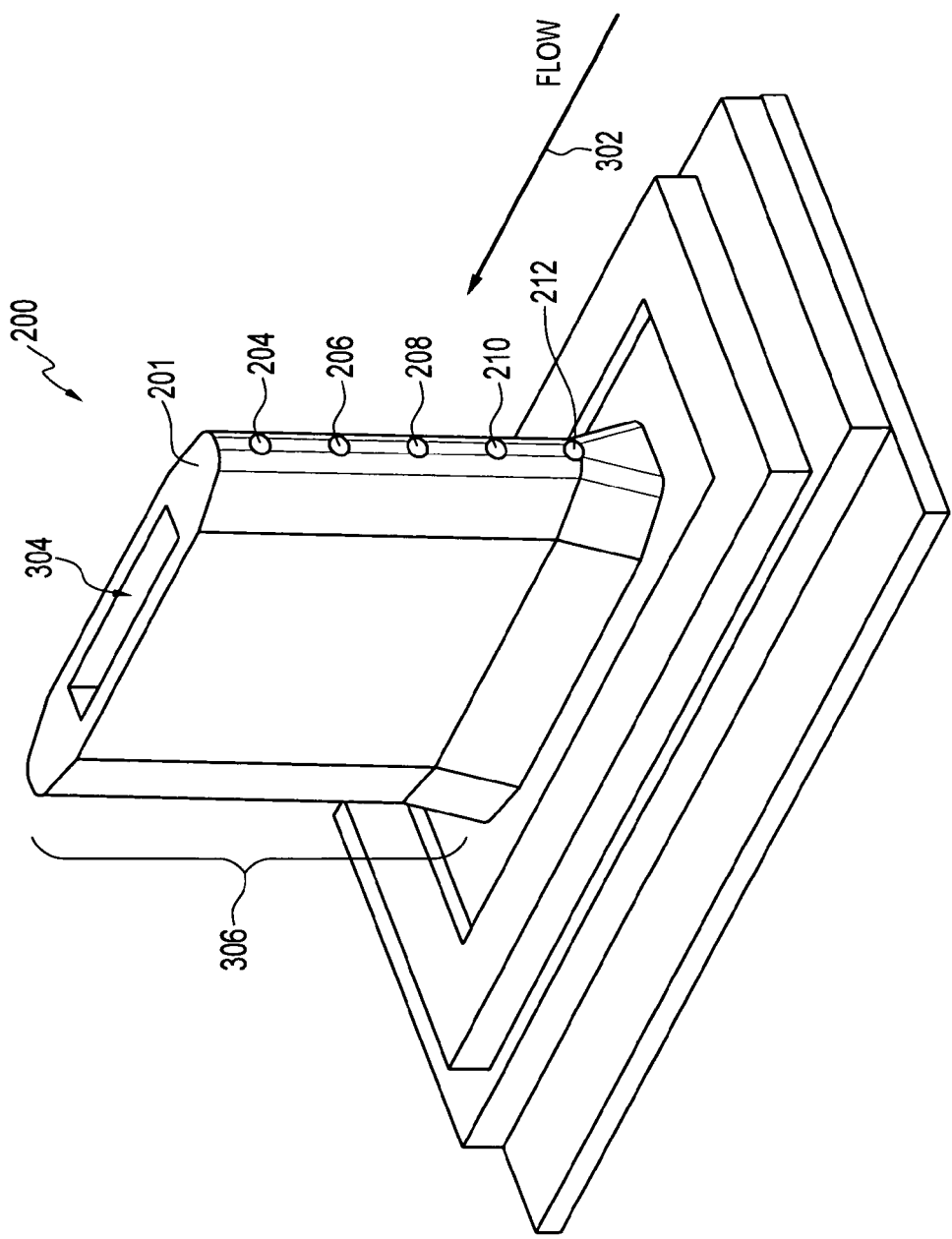
FIG. 3 illustrates a perspective view of the fluid velocity sensor apparatus depicted in FIG. 2, in accordance with an alternative, but preferred embodiment.
Figure 4:
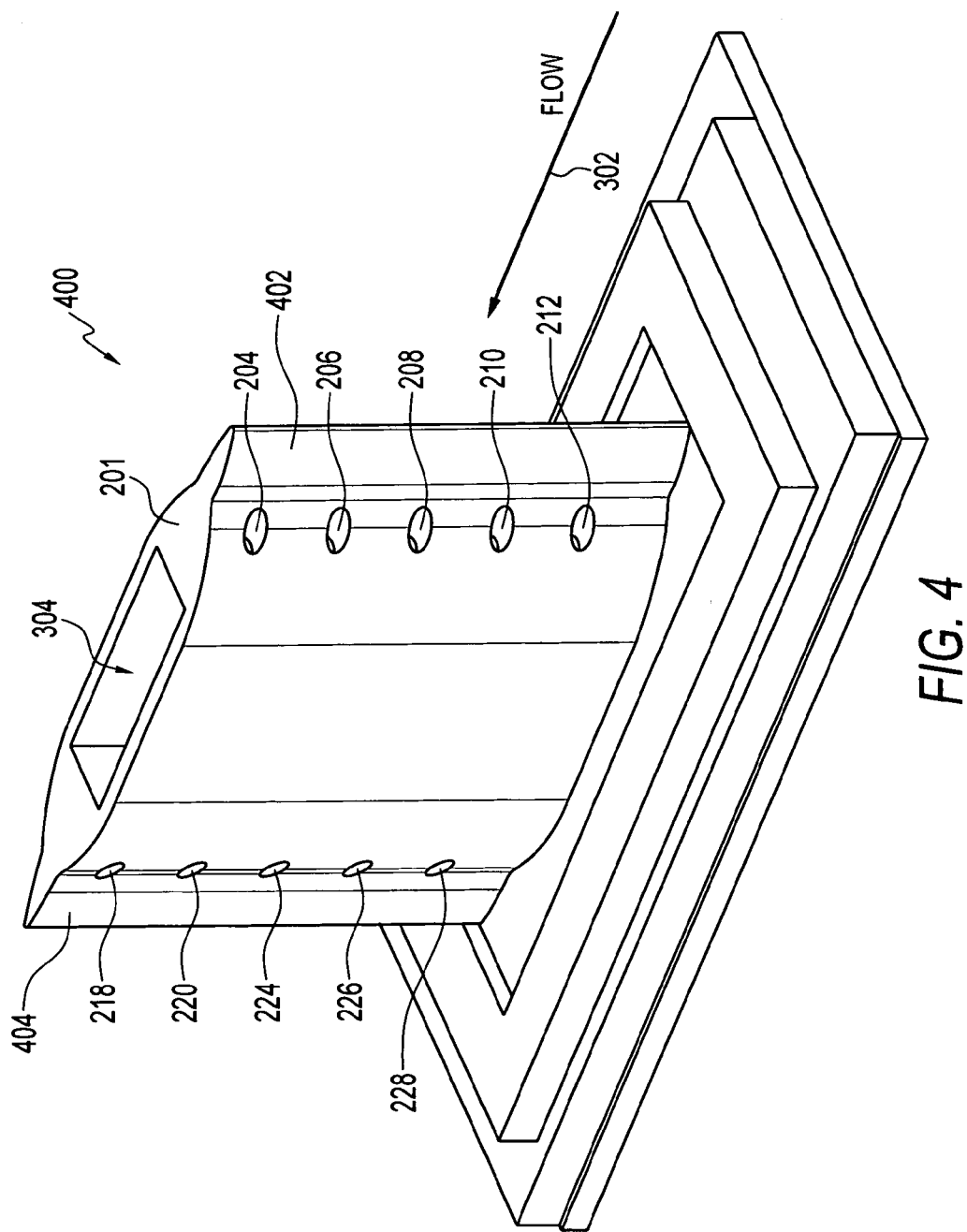
FIG. 4 illustrates a perspective view of a fluid velocity sensor apparatus with flow straighteners, in accordance with an alternative embodiment.

FIG. 3 illustrates a perspective view of the fluid velocity sensor apparatus 200 depicted in FIG. 2, in accordance with an alternative, but preferred embodiment. Note that in FIGS. 2-3, identical or similar parts or elements are generally indicated by identical reference numerals. Thus, the inlet ports 204, 206, 208, 210, and 212 are also illustrated in FIG. 3. An arrow 302 indicates the general direction of fluid flow toward and into the inlet ports 204, 206, 208, 210, and 212. The chamber 304 is also depicted in FIG. 4. Although the ports 218, 220, 224, 226, and 228 can not be clearly seen in FIG. 3 due to the perspective view depicted in FIG. 3, the general location 306 of the ports 218, 220, 224, 226, and 228 is indicated in FIG. 3.

FIG. 4 illustrates a perspective view of a fluid velocity sensor apparatus 400 with flow straighteners 402, 404, in accordance with an alternative embodiment. Note that in FIGS. 2-5, identical or similar parts or elements are generally indicated by identical reference numerals. The apparatus 400 depicted in FIG. 4 is similar to apparatus 200 described earlier, with the addition of flow straighteners 402 and 404. As indicated previously, the inlet ports or taps 204, 206, 208, 210, and 212 face into the direction of flow indicated by arrow 302, while the taps 218, 220, 224, 226, and 228 face opposite the direction of flow. Apparatus 400 thus illustrates an alternative version of the apparatus 200 described earlier.

Figure 5:
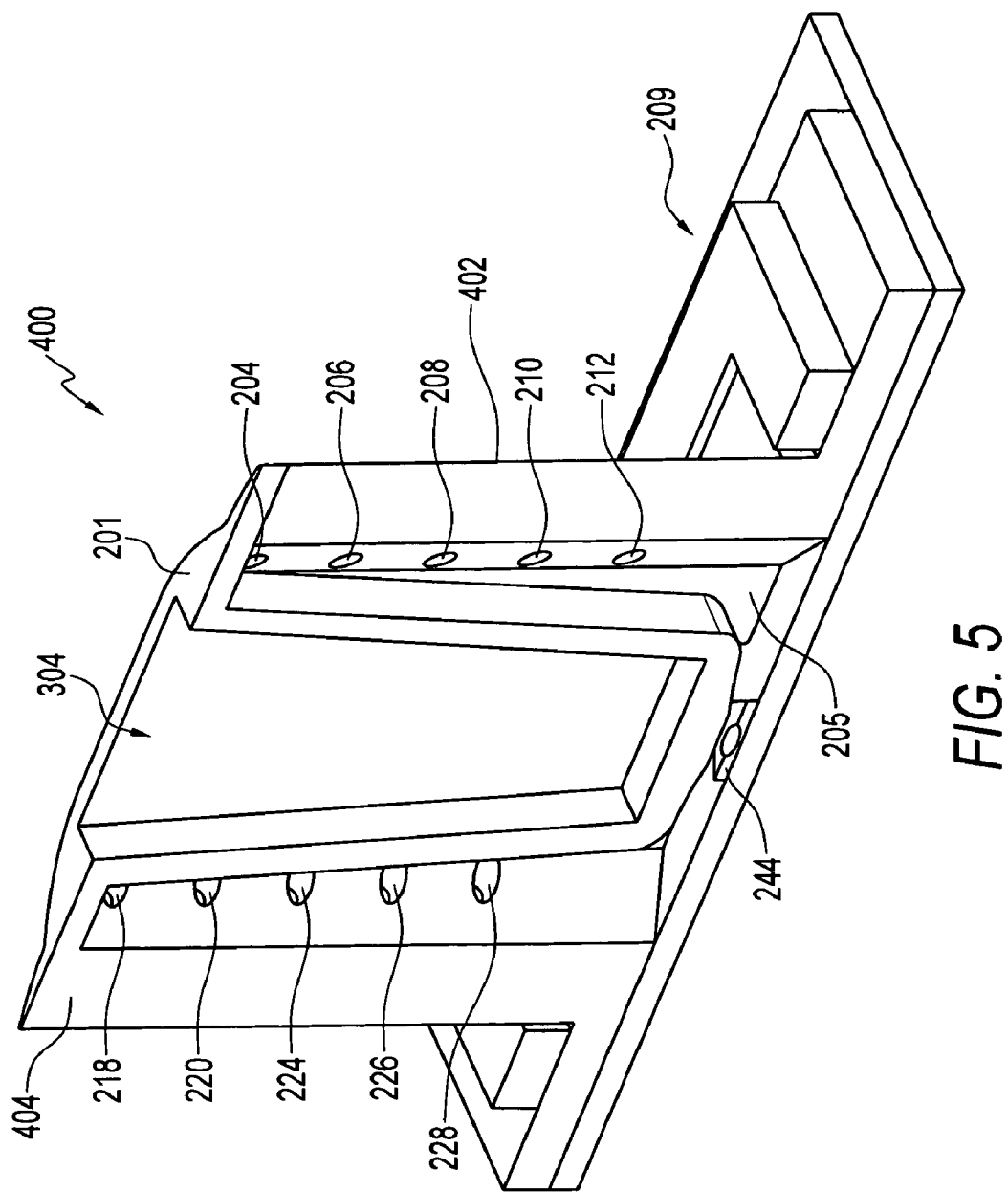
FIG. 5 illustrates a cut-away sectional view of the fluid velocity sensor apparatus depicted in FIG. 4 in accordance with an alternative embodiment.

FIG. 5 illustrates a cut-away sectional view of the fluid velocity sensor apparatus 400 depicted in FIG. 4 in accordance with an alternative embodiment. As indicated in FIG. 5, the flow sensor 244 is maintained generally by housing 201. Flow straightener 402 is located adjacent to the taps 204, 206, 208, 210, and 212, while the flow straightener 404 is located adjacent to the taps 218, 220, 224, 226, and 228. Note that FIGS. 1-5 generally illustrate not only the apparatus 100, 200, 400, but also indicate the general methodology for constructing such devices. Note that FIGS. 2-5 generally illustrate a bi-directional sensor approach with downstream taps facing the opposite direction of the flow.

Figure 6:
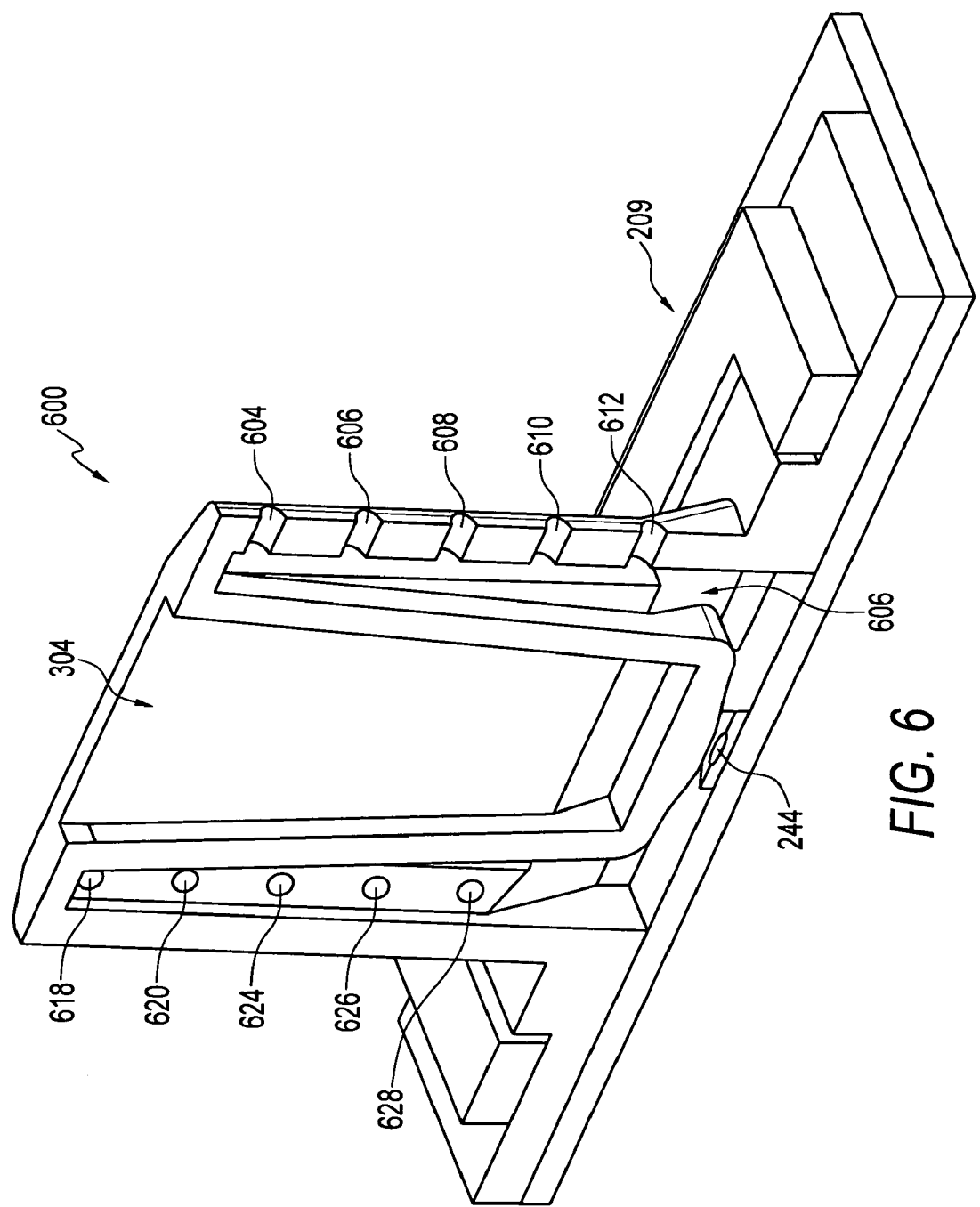
FIGS. 6-7 generally illustrate respective cut-away and perspective view of a fluid velocity sensor apparatus, which can be implemented in accordance with an alternative embodiment.
Figure 7:
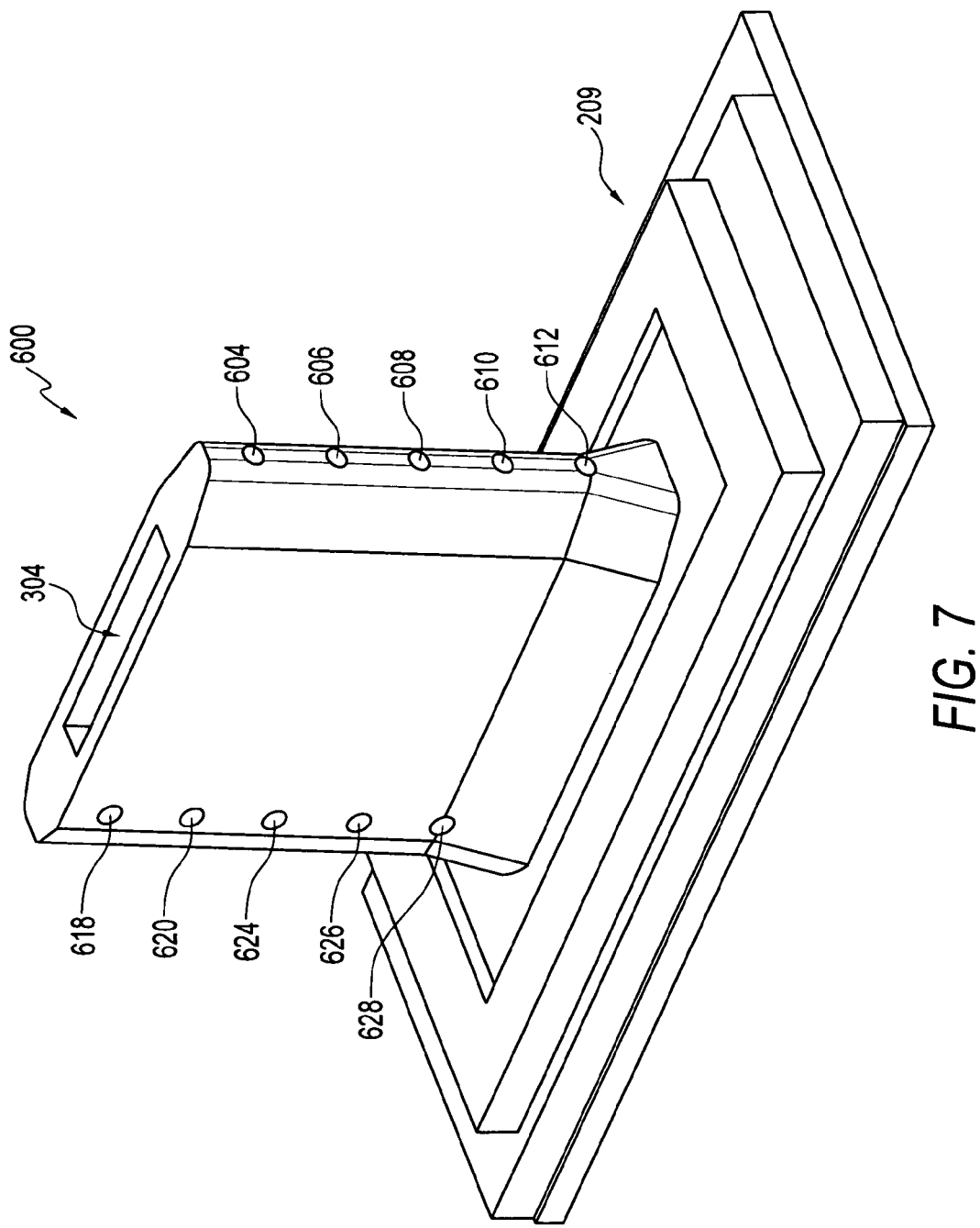

FIGS. 6-7 generally illustrate respective cut-away and perspective view of a fluid velocity sensor apparatus 600, which can be implemented in accordance with an alternative embodiment. Note that similar to the structure of apparatus 100 depicted in FIG. 1, FIGS. 6-7 illustrate a uni-directional sensor structure, unlike the bi-directional sensor structure depicted in FIGS. 2-5. The configuration depicted in FIGS. 6-7 thus illustrates another methodology and/or unidirectional structural embodiment. Some of the features in FIGS. 6-7 are similar to that shown in FIGS. 2-5. For example, a platform 209 is depicted in FIGS. 6-7 in addition to a sensor die or sensor component 244. Apparatus 600 includes a plurality of ports or taps 604, 606, 608, 610, and 612 and a plurality of outlet ports or taps 618, 620, 624, 626, and 628. A passage or flow area 606 is also depicted in FIGS. 6-7 in addition the chamber 304, which is similar to the chamber 304 described earlier. The sensor structure depicted in FIGS. 6-7 is similar to that of the structure disclosed in FIG. 1, except with that apparatus 600 is arranged in a manifold type mount. The difference between apparatus 100 and 600 is thus subtle but important for how each type of sensor functions.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A fluid velocity sensor apparatus, comprising:
   a housing within a flow channel defined by a flow channel wall;
   a sensor die within said housing for detecting a fluid property of a fluid flowing through a low resistance flow channel defined by a second flow channel wall configured within said housing wherein said low resistance flow channel produces a laminar flow of said fluid; and
   at least one tap configured upon said housing facing into a direction of a flow stream of a fluid flowing through said flow channel, wherein said at least one tap leads to said low resistance flow channel, which directs said flow of fluid to said sensor die, such that said fluid after passing over said sensor die continues on a low resistance path to at least one other tap in order to determine a velocity pressure based on a difference between a pressure identified by said at least one tap and a pressure identified by said at least one other tap.

2. The apparatus of claim 1 wherein:
   said at least one tap comprises an upstream tap oriented in an upstream location of said flow channel, wherein said upstream tap faces a direction of said flow of said fluid through said flow channel, wherein said upstream tap senses a stagnation pressure of said fluid; and
   said at least one other tap comprises a downstream tap oriented to face perpendicular to said flow of said fluid, wherein said downstream tap senses a static pressure, wherein a difference between said stagnation pressure and said static pressure comprises said velocity pressure.

3. The apparatus of claim 1 wherein said at least one tap comprises an upstream tap oriented in an upstream location of said flow channel, wherein said upstream tap faces a direction of said flow of said fluid through said flow channel, wherein said upstream tap senses a stagnation pressure of said fluid; and
   said at least one other tap comprises a downstream tap oriented to face parallel to said flow of said fluid, wherein said downstream tap senses a static pressure, wherein a difference between said stagnation pressure and said static pressure comprises said velocity pressure, wherein said velocity pressure is a measurement of a bi-directional flow of fluid through said flow channel.

4. The apparatus of claim 3 further comprising at least one flow straightener configured upon said housing, wherein said at least one flow straightener promotes said bi-directional flow of fluid through said flow channel.

5. The apparatus of claim 4 wherein said at least one flow straightener comprises a shape of a narrow, elongated protrusion that prevents flow eddies that create pressure instability.

6. The apparatus of claim 1 wherein said sensor die comprises a Micro-electro-mechanical Systems (MEMS) sensor.

7. A fluid velocity sensor apparatus, comprising:
a housing within a flow channel defined by a flow channel wall;
a sensor die within said housing for detecting a fluid property of a fluid flowing through a low resistance flow channel defined by a second flow channel wall wherein said low resistance flow channel produces a laminar flow of said fluid;
at least one tap configured upon said housing facing into a direction of a flow stream of a fluid flowing through said flow channel, wherein said at least one tap leads to said low resistance flow channel, which directs said flow of fluid to said sensor die, such that said fluid after passing over said sensor die continues on a low resistance path to at least one other tap in order to determine a velocity pressure based on a difference between a pressure identified by said at least one tap and a pressure identified by said at least one other tap; and
at least one flow straightener configured upon said housing, wherein said flow straightener promotes a bi-directional flow of fluid through said flow channel.

8. The apparatus of claim 7 wherein said at least one flow straightener comprises a shape of a narrow, elongated protrusion that prevents flow eddies that create pressure instability.

9. The apparatus of claim 7 wherein;
said at least one tap comprises an upstream tap oriented in an upstream location of said flow channel, wherein said upstream tap faces a direction of said flow of said fluid through said flow channel, wherein said upstream tap senses a stagnation pressure of said fluid; and
said at least one other tap comprises a downstream tap oriented to face perpendicular to said flow of said fluid, wherein said downstream tap senses a static pressure, wherein a difference between said stagnation pressure and said static pressure comprises said velocity pressure.

10. The apparatus of claim 7 wherein said at least one flow straightener comprises a plurality of flow straighteners.

11. The apparatus of claim 7 wherein said sensor die comprises a MEMS sensor.

12. A fluid velocity sensor apparatus, comprising:
a housing within a flow channel defined by a flow channel wall;
a sensor die within said housing for detecting a fluid property of a fluid flowing through a low resistance flow channel defined by a second flow channel wall wherein said low resistance flow channel produces a laminar flow of said fluid; and at least one tap configured upon said housing facing into a direction of a flow stream of a fluid flowing through said flow channel defined by a flow channel wall, wherein said at least one tap leads to said low resistance flow channel, which directs said flow of fluid to said sensor die, such that said fluid after passing over said sensor die continues on a low resistance path to at least one other tap that faces opposite said direction of flow in order to determine a velocity of said fluid.

13. The apparatus of claim 12 wherein said at least one tap comprises an upstream tap oriented in an upstream location of said flow channel, wherein said upstream tap faces a direction of said flow of said fluid through said flow channel, wherein said upstream tap senses a stagnation pressure of said fluid; and
said at least one other tap comprises a downstream tap oriented to face parallel to said flow of said fluid, wherein said downstream tap senses a static pressure, wherein a difference between said stagnation pressure and said static pressure comprises said velocity pressure, wherein said velocity pressure is a measurement of a bi-directional flow of fluid through said flow channel.

14. The apparatus of claim 12 wherein said sensor die comprises a MEMS sensor.

15. The apparatus of claim 12 further comprising at least one flow straightener configured upon said housing, wherein said at least one flow straightener promotes a bi-directional flow of fluid through said flow channel.

16. The apparatus of claim 15 wherein said at least one flow straightener comprises a shape of a narrow, elongated protrusion that prevents flow eddies that create pressure instability.

17. A method of forming a fluid velocity sensor apparatus, comprising:
providing a housing within a flow channel defined by a flow channel wall;
providing a sensor die within said housing for detecting a fluid property of a fluid flowing through a low resistance flow channel defined by a second flow channel wall wherein said low resistance flow channel produces a laminar flow of said fluid; and
locating at least one tap configured upon said housing facing into a direction of a flow stream of a fluid flowing through said flow channel defined by a flow channel wall, wherein said at least one tap leads to said low resistance flow channel, which directs said flow of fluid to said sensor die, such that said fluid after passing over said sensor die continues on a low resistance path to at least one other tap in order to determine a velocity pressure based on a difference between a pressure identified by said at least one tap and a pressure identified by said at least one other tap.

18. The method of claim 17 further comprising:
configuring said at least one tap to comprise an upstream tap oriented in an upstream location of said flow channel, wherein said upstream tap faces a direction of said flow of said fluid through said flow channel, wherein said upstream tap senses a stagnation pressure of said fluid; and
configuring said at least one other tap to comprise a downstream tap oriented to face perpendicular to said flow of said fluid, wherein said downstream tap senses a static pressure, wherein a difference between said stagnation pressure and said static pressure comprises said velocity pressure.

19. The method of claim 17 further comprising configuring at least one flow straightener upon said housing, wherein said at least one flow straightener promotes a bi-directional flow of fluid through said flow channel.

20. The method of claim 17 wherein said sensor die comprises a MEMS sensor.

* * * * *